US011117444B2

(12) United States Patent
Kim et al.

(10) Patent No.: US 11,117,444 B2
(45) Date of Patent: Sep. 14, 2021

(54) HEAT PUMP SYSTEM FOR VEHICLE

(71) Applicant: HANON SYSTEMS, Daejeon (KR)

(72) Inventors: Seong Hun Kim, Daejeon (KR); Hae Jun Lee, Daejeon (KR); Sung Je Lee, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 15 days.

(21) Appl. No.: 16/478,952

(22) PCT Filed: Feb. 21, 2018

(86) PCT No.: PCT/KR2018/002089
§ 371 (c)(1),
(2) Date: Jul. 18, 2019

(87) PCT Pub. No.: WO2018/155886
PCT Pub. Date: Aug. 30, 2018

(65) Prior Publication Data
US 2019/0359030 A1    Nov. 28, 2019

(30) Foreign Application Priority Data

Feb. 21, 2017  (KR) .................. 10-2017-0022969

(51) Int. Cl.
*F25B 29/00*    (2006.01)
*B60H 1/00*    (2006.01)
(Continued)

(52) U.S. Cl.
CPC .......... *B60H 1/00907* (2013.01); *B60H 1/08* (2013.01); *B60H 1/14* (2013.01); *F25B 30/02* (2013.01);
(Continued)

(58) Field of Classification Search
CPC .............. F25B 30/02; F25B 2400/0403; F25B 2600/2513; B60H 1/00907; B60H 1/08; B60H 1/14
(Continued)

(56) References Cited

U.S. PATENT DOCUMENTS 9,643,473 B2 *  5/2017  Kang ................. B60H 1/00921
9,810,465 B2 * 11/2017  Kang ........................ F25B 5/00
(Continued)

FOREIGN PATENT DOCUMENTS

KR    20140147365 A    12/2014
KR    20150088953 A     8/2015
(Continued)

OTHER PUBLICATIONS

International Search Report and Written Opinion dated May 23, 2018 from corresponding International Patent Application No. PCT/KR2018/002089 with English translation of International Search Report.

*Primary Examiner* — Claire E Rojohn, III
(74) *Attorney, Agent, or Firm* — Dickinson Wright PLLC

(57) ABSTRACT

The present invention relates to a heat pump system for a vehicle which can enhance heating performance of a plug-in hybrid vehicle by heating engine coolant necessary for heating using a refrigerant cycle. The heat pump system for a vehicle includes: an evaporator disposed inside an air-conditioning case to exchange heat between air and refrigerant; a heater core disposed inside the air-conditioning case to exchange heat between air and coolant; a first coolant line connecting an engine with the heater core so that the coolant is circulated; a first refrigerant circulation loop which circulates a compressor for compressing and discharging the refrigerant, an air-cooled condenser for exchanging heat between the refrigerant and air, a first expansion means for expanding the refrigerant, and the evaporator in a cooling (Continued)

mode; and a second refrigerant circulation loop which circulates the compressor, a water-cooled heat exchanger for exchanging heat between the refrigerant and the coolant, a second expansion means for expanding the refrigerant, and the air-cooled condenser in a heating mode. The water-cooled heat exchanger is disposed in the first coolant line between the engine and the heater core to exchange heat between the refrigerant of high temperature and high pressure passing through the compressor and the coolant of the first coolant line.

15 Claims, 11 Drawing Sheets

(51) Int. Cl.
  *B60H 1/08* (2006.01)
  *B60H 1/14* (2006.01)
  *F25B 30/02* (2006.01)
(52) U.S. Cl.
  CPC ............... *F25B 2400/0403* (2013.01); *F25B 2600/2513* (2013.01)
(58) Field of Classification Search
  USPC ....................................................... 165/240
  See application file for complete search history.

(56) References Cited

U.S. PATENT DOCUMENTS

| | | | |
|---|---|---|---|
| 2001/0013409 A1* | 8/2001 | Burk | B60H 1/025 165/240 |
| 2002/0040896 A1* | 4/2002 | Ap | B60L 3/0046 219/208 |
| 2002/0043413 A1* | 4/2002 | Kimishima | H01M 10/613 180/68.1 |
| 2005/0115748 A1* | 6/2005 | Lanier | B60L 50/53 180/65.1 |
| 2005/0241865 A1* | 11/2005 | Varenne | B60L 3/003 180/65.1 |
| 2008/0251235 A1* | 10/2008 | Zhou | B60L 3/003 165/41 |
| 2009/0024256 A1* | 1/2009 | Adams | B60L 58/26 700/300 |
| 2009/0139781 A1* | 6/2009 | Straubel | B60L 50/64 180/65.1 |
| 2009/0227194 A1* | 9/2009 | Johnston | B60L 53/14 454/152 |
| 2009/0280395 A1* | 11/2009 | Nemesh | B60L 58/27 429/62 |
| 2012/0225341 A1* | 9/2012 | Major | B60H 1/00278 429/120 |
| 2012/0227431 A1* | 9/2012 | Wang | B60H 1/143 62/238.7 |
| 2013/0074525 A1* | 3/2013 | Johnston | B60H 1/00385 62/56 |
| 2013/0118707 A1* | 5/2013 | Kardos | H01M 10/613 165/42 |
| 2013/0152611 A1* | 6/2013 | Furll | B60H 1/00007 62/79 |
| 2014/0033761 A1* | 2/2014 | Kawakami | F25B 13/00 62/498 |
| 2014/0060102 A1* | 3/2014 | Nemesh | B60H 1/00278 62/238.7 |
| 2014/0126689 A1* | 5/2014 | Hara | A61B 6/0407 378/19 |
| 2015/0217625 A1* | 8/2015 | Kang | B60H 1/00921 62/160 |
| 2015/0217627 A1* | 8/2015 | Kang | F25B 41/20 62/324.6 |
| 2016/0082805 A1* | 3/2016 | Graaf | B60H 1/14 165/202 |
| 2016/0107501 A1* | 4/2016 | Johnston | B60H 1/00278 165/202 |
| 2016/0107502 A1* | 4/2016 | Johnston | B60H 1/32284 165/202 |
| 2016/0107503 A1* | 4/2016 | Johnston | B60H 1/32284 165/202 |
| 2016/0107504 A1* | 4/2016 | Johnston | B60H 1/00921 165/202 |
| 2016/0107505 A1* | 4/2016 | Johnston | B60H 1/00914 165/202 |
| 2016/0107506 A1* | 4/2016 | Johnston | B60H 1/00278 165/202 |
| 2016/0107508 A1* | 4/2016 | Johnston | H01M 10/663 165/202 |
| 2016/0318370 A1* | 11/2016 | Rawlinson | B60L 3/0061 |
| 2017/0008407 A1* | 1/2017 | Porras | B60L 58/24 |
| 2017/0021698 A1* | 1/2017 | Hatakeyama | B60H 1/143 |
| 2017/0158081 A1* | 6/2017 | Kim | H01M 10/615 |
| 2017/0297408 A1* | 10/2017 | Kim | B60H 1/00899 |
| 2017/0317393 A1* | 11/2017 | Blatchley | H01M 10/625 |
| 2019/0030991 A1* | 1/2019 | Enomoto | B60H 1/00885 |
| 2019/0225047 A1* | 7/2019 | Porras | B60H 1/00778 |

FOREIGN PATENT DOCUMENTS

| | | | |
|---|---|---|---|
| KR | 20160102672 A | | 8/2016 |
| KR | 20160110719 A | | 9/2016 |
| KR | 20160133028 A | * | 11/2016 |
| KR | 20160133028 A | | 11/2016 |

* cited by examiner

PRIOR ART

HEAT PUMP SYSTEM FOR VEHICLE

CROSS-REFERENCE TO RELATED APPLICATIONS

This application is a U.S. National Stage of International Application No. PCT/KR2018/002089 filed Feb. 21, 2018, which claims the benefit and priority of KR 10-2017-0022969 filed Feb. 21, 2017. The entire disclosures of each of the above applications are incorporated herein by reference.

TECHNICAL FIELD

The present invention relates to a heat pump system for a vehicle, and more particularly, to a heat pump system for a vehicle which can selectively carry out cooling and heating by changing a flow direction of refrigerant using one refrigerant cycle.

BACKGROUND ART

In general, an air conditioner for a vehicle includes a cooling system for cooling the interior of the vehicle, and a heating system for heating the interior of the vehicle. The cooling system converts the air, which passes the outside of an evaporator, into cold air by exchanging heat between the air and refrigerant, which flows inside the evaporator, from the evaporator side to cool the interior of the vehicle. The heating system converts the air, which passes the outside of a heater core of a cooling water cycle, into warm air by exchanging heat between the air and cooling water, which flows inside the heater core, from the heater core side to heat the interior of the vehicle.

In the meantime, differently from the air conditioner for the vehicle, a heat pump system which is capable of selectively carrying out cooling and heating by changing a flow direction of refrigerant using one refrigerant cycle is disclosed. The heat pump system includes, for instance, two heat exchangers, namely, an indoor heat exchanger mounted inside an air-conditioning case to exchange heat with air blown to the interior of the vehicle and an outdoor heat exchanger mounted outside the air-conditioning case to exchange heat, and a direction-changing valve for changing a flow direction of refrigerant. Therefore, the indoor heat exchanger serves as a heat exchanger for cooling when the heat pump system is operated in a cooling mode according to the flow direction of refrigerant by the direction-changing valve and also serves as a heat exchanger for heating when the heat pump system is operated in a heating mode.

Meanwhile, a hybrid vehicle operated by an engine (Internal combustion engine) and an electric motor uses waste heat (cooling water) of the engine as a heating heat source for interior heating. That is, the hybrid vehicle can use an air conditioner in the same way as the conventional vehicle, but uses residual heat of cooling water of the engine as a heating heat source even though the engine is turned off when being operated by the electric motor. In the case that the vehicle is operated by the electric motor, if outdoor temperature is low, (namely, below about zero degree), the hybrid vehicle is deteriorated in fuel efficiency since forcibly operating the engine in order to secure the heating heat source even though it can be operated by the electric motor.

FIG. 1 illustrates a heating circuit of a conventional heat pump system for a vehicle. Referring to FIG. 1, coolant flowing in a coolant line 2 is heated while passing through an engine 1, flows into a heater core 3, and then, exchanges heat with air discharged to the interior of the vehicle to be used as a heating heat source. A water pump 5 circulates the coolant. In summer, a valve 7 is opened, then, the coolant heated while passing through the engine 1 flows to a radiator 6 to exchange heat with outdoor air.

In case of a plug-in hybrid vehicle (PHEV), it generally drives in an electrically driving mode, but if it needs heating of the vehicle, the engine is unnecessarily operated in order to raise water temperature of coolant. In this instance, even though the engine is operated, since heat generation of the engine is not large, an internal combustion engine is lacking in heating performance, so the vehicle needs an auxiliary heating device, such as a PTC heater 4.

DISCLOSURE

Technical Problem

Accordingly, the present invention has been made in view of the above-mentioned problems occurring in the prior art, and it is an object of the present invention to provide a heat pump system for a vehicle which can enhance heating performance of a plug-in hybrid vehicle by heating engine coolant necessary for heating using a refrigerant cycle.

Technical Solution

To accomplish the above object, according to the present invention, there is provided a heat pump system for a vehicle including: an evaporator disposed inside an air-conditioning case to exchange heat between air and refrigerant; a heater core disposed inside the air-conditioning case to exchange heat between air and coolant; a first coolant line connecting an engine with the heater core so that the coolant is circulated; a first refrigerant circulation loop which circulates a compressor for compressing and discharging the refrigerant, an air-cooled condenser for exchanging heat between the refrigerant and air, a first expansion means for expanding the refrigerant, and the evaporator in a cooling mode; and a second refrigerant circulation loop which circulates the compressor, a water-cooled heat exchanger for exchanging heat between the refrigerant and the coolant, a second expansion means for expanding the refrigerant, and the air-cooled condenser in a heating mode. The water-cooled heat exchanger is disposed in the first coolant line between the engine and the heater core to exchange heat between the refrigerant of high temperature and high pressure passing through the compressor and the coolant of the first coolant line.

Moreover, the heat pump system for a vehicle further includes: a low-temperature radiator disposed in the second coolant line to exchange heat between the coolant and air; and a second coolant line circulating electronic parts of the vehicle; and a water-cooled condenser for exchanging heat between the refrigerant and the coolant of the second coolant line in the refrigerant line between the compressor and the air-cooled condenser of the first refrigerant circulation loop.

Furthermore, the second refrigerant-coolant heat exchanger is arranged between the low-temperature radiator and the electronic parts.

Additionally, the heat pump system for a vehicle further includes: a first refrigerant branch line branching off from the refrigerant line of the refrigerant discharged from the compressor and passing through the second refrigerant-coolant heat exchanger; and a first valve for selectively flowing the refrigerant discharged from the compressor to the first refrigerant-coolant heat exchanger and the second refrigerant-coolant heat exchanger.

In addition, the first refrigerant branch line is connected between the second expansion means and the air-cooled condenser.

Moreover, the heat pump system for a vehicle further includes: a second refrigerant branch line branching off from the refrigerant line downstream of the air-cooled condenser and joining to the compressor after bypassing the evaporator; a chiller disposed in the second refrigerant branch line and arranged between the electronic parts and the low-temperature radiator to exchange heat between the refrigerant of the second refrigerant branch line and the coolant of the second coolant line; and a second valve for selectively flowing the refrigerant passing through the air-cooled condenser to the evaporator and the chiller.

Furthermore, the second refrigerant circulation loop is configured in such a way that the refrigerant flowing through the compressor, the first refrigerant-coolant heat exchanger, the second expansion means, and the air-cooled condenser in order passes the second refrigerant-coolant heat exchanger through an inlet of the air-cooled condenser of the first refrigerant circulation loop, and is returned to the compressor.

Additionally, the air-cooled condenser is connected with the refrigerant line, and includes a first connection part which is an inlet of the refrigerant in the cooling mode and is an outlet of the refrigerant in the heating mode, a second connection part which is an outlet of the refrigerant in the cooling mode, and a third connection part which is an inlet of the refrigerant in the heating mode.

In addition, a second valve is disposed in the refrigerant line between the air-cooled condenser and the first expansion means in order to open a refrigerant line passage in the cooling mode and close the passage in the heating mode.

Moreover, the heat pump system for a vehicle includes: a first refrigerant branch line branching off from the refrigerant line of the refrigerant discharged from the compressor and passing through the second refrigerant-coolant heat exchanger; a first valve for selectively flowing the refrigerant discharged from the compressor to the first refrigerant-coolant heat exchanger and the second refrigerant-coolant heat exchanger; a third refrigerant branch line branching off from the first refrigerant branch line between the first valve and the second refrigerant-coolant heat exchanger and connected to the upstream side of the compressor; and a third valve disposed in the third refrigerant branch line to close the passage in the cooling mode and open the passage in the heating mode.

In another aspect of the present invention, there is provided a heat pump system for a vehicle including: a compressor for compressing and discharging refrigerant; an evaporator disposed inside an air-conditioning case to exchange heat between air and the refrigerant; a heater core disposed inside the air-conditioning case to exchange heat between air and coolant; a first coolant line for connecting the heater core and the engine with each other so that the coolant is circulated; a second coolant line circulating vehicle electronic parts; a low-temperature radiator disposed in the second coolant line to exchange heat between the coolant and air; a water-cooled condenser disposed in the second coolant line between the low-temperature radiator and the electronic parts; and a water-cooled heat exchanger disposed in the first coolant line between the heater core and the engine, wherein the water-cooled heat exchanger and the water-cooled condenser are integrated to form a module unit, and the refrigerant discharged from the compressor passes through all of the water-cooled heat exchanger and the water-cooled condenser to exchange heat with the coolant of the first coolant line and the coolant of the second coolant line.

Furthermore, the heat pump system for a vehicle further includes: a first expansion means disposed upstream of the evaporator to expand the refrigerant; and a second expansion means disposed between the water-cooled condenser and the air-cooled condenser to operate as a two-way valve in the cooling mode and as an orifice in the heating mode.

Additionally, the heat pump system for a vehicle further includes: a second refrigerant branch line branching off from the refrigerant line downstream of the air-cooled condenser, bypassing the evaporator and joining to the compressor; a chiller disposed in the second refrigerant branch line and arranged between the electronic parts and the low-temperature radiator to exchange heat between the refrigerant of the second refrigerant branch line and the coolant of the second coolant line; and a second valve for selectively flowing the refrigerant passing through the air-cooled condenser to the evaporator and the chiller.

Advantageous Effects

As described above, the heat pump system for a vehicle according to the present invention can heat the interior of the vehicle using the cooling heat pump system without operation of the engine, can reduce the cost and volume by integrating the water-cooled heat exchanger and the water-cooled condenser and simplifying the valve and the circuit, and recover waste heat effectively even though the chiller is deleted.

MODE FOR INVENTION

Hereinafter, a technical structure of the present invention will be described in detail with reference to the accompanying drawings.

Figure 1:
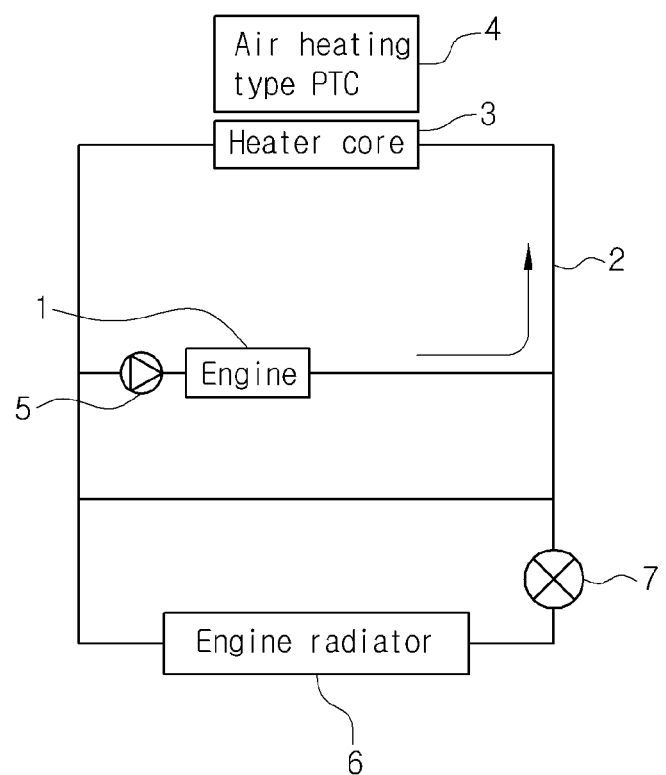
FIG. 1 illustrates a heating circuit of a conventional heat pump system for a vehicle.
Figure 2:
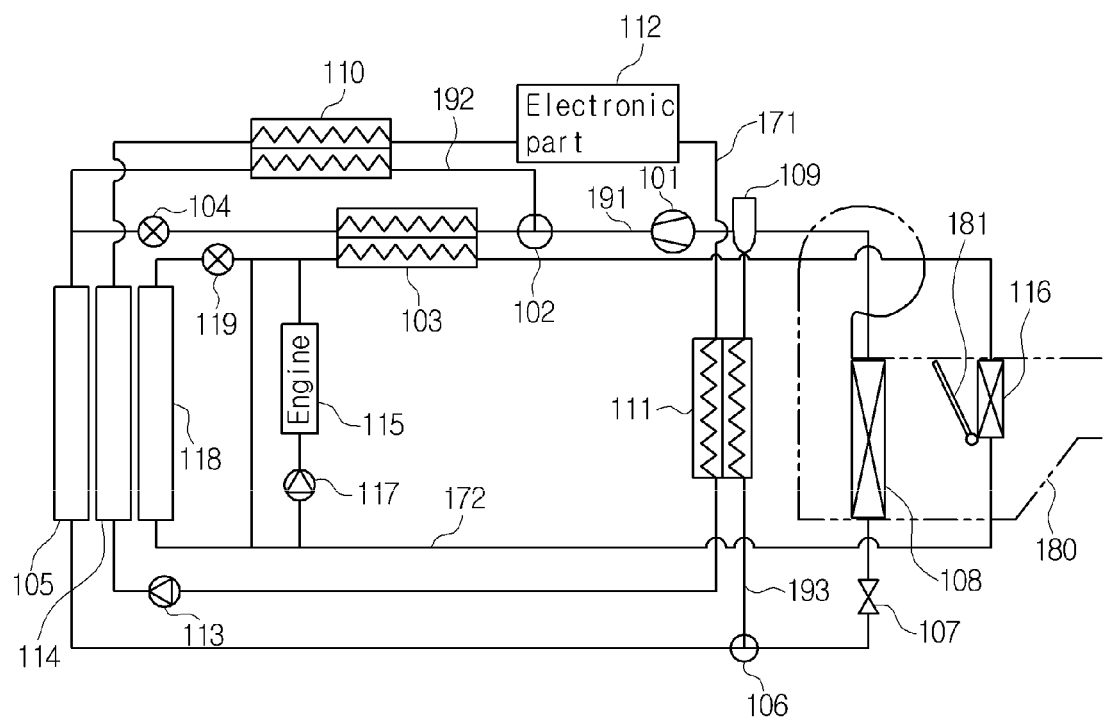
FIG. 2 is a view of a heat pump system for a vehicle according to a first preferred embodiment of the present invention.

FIG. 2 is a view of a heat pump system for a vehicle according to a first preferred embodiment of the present invention.

The heat pump system for a vehicle according to the present invention includes: a refrigerant circulation loop disposed inside an air-conditioning case 180 and having an evaporator 108 for exchanging heat between air and refrigerant; a first coolant line 172 disposed inside the air-conditioning case 180 and circulating a heater core 116, which exchanges heat between air and coolant; a second coolant line 171 for cooling electronic parts 112 of the vehicle; a first refrigerant-coolant heat exchanger for exchanging heat between the refrigerant and coolant of the first coolant line 172; and a second refrigerant-coolant heat exchanger for exchanging heat between the refrigerant and coolant of the second coolant line 171.

Hereinafter, the first refrigerant-coolant heat exchanger is a water-cooled heat exchanger 103, and the second refrigerant-coolant heat exchanger is a water-cooled condenser 110.

Referring to FIG. 2, the heat pump system for a vehicle according to the first preferred embodiment of the present invention is applied to a plug-in hybrid vehicle or an electric vehicle, and includes an evaporator 108, a heater core 116, a first coolant line 172, a compressor 101, an air-cooled condenser 105, a first expansion means 107, a water-cooled heat exchanger 103, and a second expansion means 104.

The evaporator 108 is disposed inside an air-conditioning case 180 and exchanges heat between air and refrigerant flowing inside the air-conditioning case 180. The heater core 116 is disposed inside the air-conditioning case 180 and exchanges heat between the air and coolant flowing inside the air-conditioning case 180. The first coolant line 172 is a passage for connecting the heater core 116 and an engine 115 to circulate the coolant.

The coolant flowing in the first coolant line 172 recovers and heats waste heat of the engine while passing through the engine 115 and exchanges heat with air, which flows into the heater core 116 and is discharged to the interior of the vehicle, to be used as a heating heat source. A water pump 117 for circulating the coolant is disposed in the first coolant line 172. In the summer season, when a valve 119 is opened, the coolant heated while passing through the engine 115 flows to an engine radiator 118 and radiates heat by exchanging heat with outdoor air.

The compressor 101 inhales and compresses refrigerant, and then, discharges the compressed refrigerant into a gaseous state of high temperature and high pressure. A temperature adjusting door 181 for adjusting the volume of air bypassing the heater core 116 and the volume of air passing through the heater core 116 is disposed between the evaporator 108 and the heater core 116 inside the air-conditioning case 180. An accumulator 109, which separates the refrigerant flowing to the compressor 101 into liquid-phase refrigerant and gas-phase refrigerant and supplies only the gas-phase refrigerant, is disposed at an inlet of the compressor 101.

The air-cooled condenser 105 is to exchange heat between refrigerant and air, and may be disposed side by side with the engine radiator 118 at the front of the vehicle. A blower may be disposed at the front or the rear of the air-cooled condenser.

The first expansion means 107 expands the refrigerant passing through the air-cooled condenser 105 into a low-temperature and low-pressure state. The second expansion means 104 is disposed upstream of the air-cooled condenser 105 to expand the refrigerant. In this instance, preferably, the first expansion means 107 is an expansion valve actuated mechanically or electronically, and the second expansion means 104 is an orifice.

The water-cooled heat exchanger 103 exchanges heat between the refrigerant and the coolant. The water-cooled heat exchanger 103 is disposed in the first coolant line 172 between the engine 115 and the heater core 116 in order to exchange heat between the refrigerant of high temperature and high pressure passing through the compressor 101 with the coolant of the first coolant line 172. The coolant of the first coolant line 172 is heated through heat exchange with the refrigerant of high temperature by the water-cooled heat exchanger 103, and then, flows toward the heater core 116. Through the above, if heating of the vehicle is needed, the heat pump system can operate a heat pump cooling mode to heat the coolant without unnecessary operation of the engine.

The heat pump system for a vehicle is comprised of a first refrigerant circulation loop which is a circulation passage of refrigerant in the cooling mode and a second refrigerant circulation loop which is a circulation passage of refrigerant in the heating mode. The first refrigerant circulation loop makes the refrigerant circulate through the compressor 101, the air-cooled condenser 105, the expansion means 107, the evaporator 108, and the compressor 101 in order. The second refrigerant circulation loop makes the refrigerant circulate through the compressor 101, the water-cooled heat exchanger 103, the second expansion means 104, the air-cooled condenser 105, and the compressor 101 in order. Referring to the drawings, operation examples of the refrigerant circulation loops will be described in detail later.

The heat pump system for a vehicle according to the first preferred embodiment of the present invention includes a second coolant line 171, a low temperature radiator 114, a first refrigerant branch line 192, a first valve 102, a second refrigerant branch line 193, a chiller 111, and a second valve 106.

The second coolant line 171 is a passage of coolant circulating the vehicle electronic parts 112. The low temperature radiator 114 is disposed in the second coolant line 171 to exchange heat between the coolant and air. The low temperature radiator 114 may be arranged side by side with the air-cooled condenser and the engine radiator at the front of the vehicle.

The water-cooled condenser 110 is disposed in the refrigerant line between the compressor 101 and the air-cooled condenser 105 of the first refrigerant circulation loop. The water-cooled condenser 110 exchanges heat with the coolant of the second coolant line 171. The water-cooled condenser 110 is arranged between the low temperature radiator 114 and the electronic parts 112.

The first refrigerant branch line 192 branches off from the refrigerant line 191 of the refrigerant discharged from the compressor 101 and passes through the water-cooled condenser 110. In more detail, the first refrigerant branch line 192 branches off from the refrigerant line 191 between the compressor 101 and the water-cooled heat exchanger 103, and is connected between the second expansion means 104 and the air-cooled condenser 105. Therefore, the first refrigerant branch line 192 bypasses the water-cooled heat exchanger 103 and the second expansion means 104.

The first valve 102 selectively flows the refrigerant discharged from the compressor 101 to the water-cooled heat exchanger 103 and the water-cooled condenser 110. The first valve 102 is disposed at a branching point between the refrigerant line 191 and the first refrigerant branch line 192. The first valve 102 may be a three-way valve.

The second refrigerant branch line 193 branches off from the refrigerant line 191 downstream of the air-cooled condenser 105, bypasses the evaporator 108, and is joined to the compressor 101. In more detail, the second refrigerant branch line 193 branches off from the refrigerant line 191 between the air-cooled condenser 105 and the first expansion means 107 and is connected to the accumulator 109. Therefore, the second refrigerant branch line 193 bypasses the first expansion means 107 and the evaporator 108.

The chiller 111 is disposed in the second refrigerant branch line 193, and is arranged between the electronic parts 112 and the low temperature radiator 114. The chiller 111 exchanges heat between the refrigerant of the second refrigerant branch line 193 and the coolant of the second coolant line 171. The refrigerant of low temperature passing through the second expansion means 104 and the air-cooled condenser 105 exchanges heat with the coolant passing through the electronic parts 112 to recover waste heat while passing through the chiller 111, and then, flows to the compressor 101 after passing the accumulator 109.

The second valve 106 selectively flows the refrigerant passing through the air-cooled condenser 105 to the evaporator 108 or the chiller 111. The second valve 106 is disposed at a branch point between the refrigerant line 191 and the second refrigerant branch line 193. The second valve 106 may be configured in the form of a three-way valve.

In the meantime, the heat pump system for a vehicle exchanges heat between the refrigerant discharged from the compressor and the coolant before flowing to the heater core of the first coolant line 172 in a heat pump mode, and exchanges heat between the refrigerant discharged from the compressor and the coolant before flowing to the electronic parts.

Figure 3:
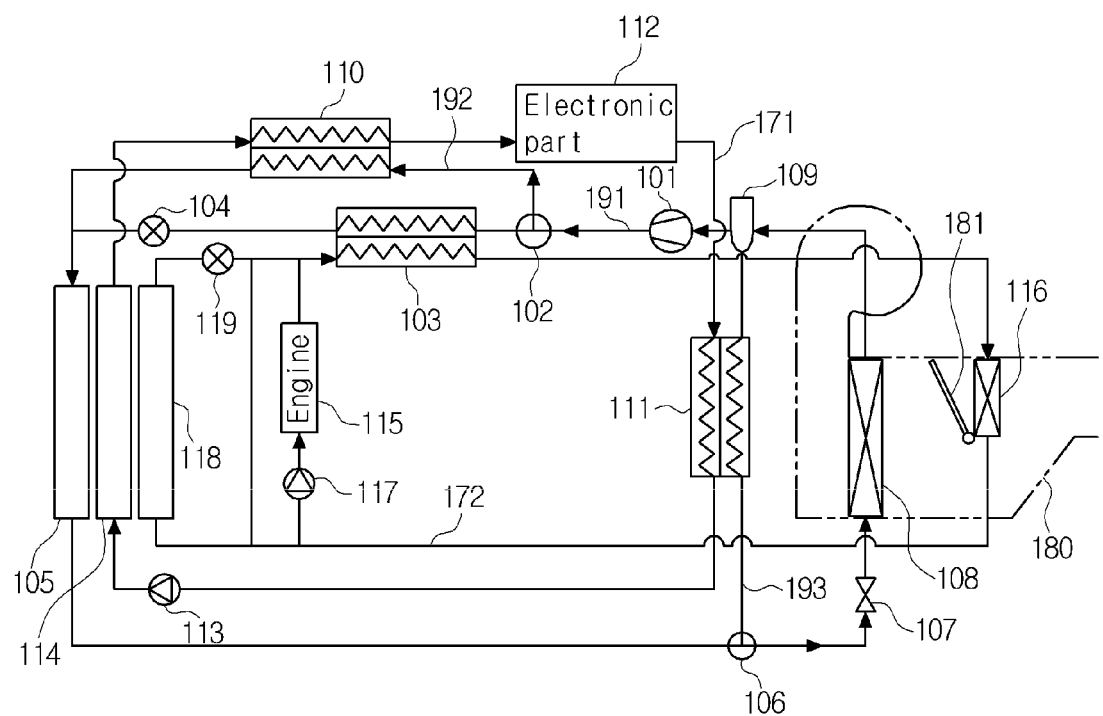
FIG. 3 is a view of a cooling mode of the heat pump system for a vehicle according to the first preferred embodiment of the present invention.

FIG. 3 is a view of a cooling mode of the heat pump system for a vehicle according to the first preferred embodiment of the present invention.

Referring to FIG. 3, in the cooling mode, the refrigerant of high temperature and high pressure discharged from the compressor 101 flows into the first refrigerant branch line 192 through the first valve 102, and passes through the air-cooled condenser 105 after passing through the water-cooled condenser 110. In the above process, the refrigerant of high temperature and high pressure is condensed through heat exchange with the coolant of the second coolant line 171 in the water-cooled condenser 110, and is condensed again through heat exchange with outdoor air in the air-cooled condenser 105.

The refrigerant passing through the air-cooled condenser 105 is expanded into a low-temperature and low-pressure state after passing through the first expansion means 107 through the second valve 106, and then, is evaporated through heat exchange with the air discharged to the interior of the vehicle while passing through the evaporator 108, so as to carry out cooling of the interior of the vehicle. The temperature adjusting door 181 closes the passage of the heater core 116. The refrigerant passing through the evaporator 108 is returned to the compressor 101 after passing the accumulator 109. In this instance, some of the refrigerant passing through the air-cooled condenser 105 flows toward the evaporator 108, and the remainder of the refrigerant flows toward the second refrigerant branch line 193 to pass through the chiller 111.

The coolant circulating in the second coolant line 171 repeatedly circulates the electronic parts 112, the chiller 111, the low temperature radiator 114, the water-cooled condenser 110, and the electronic parts 112 by the water pump 113. Furthermore, the coolant circulating in the first coolant line 172 repeatedly circulates the engine 115, the water-cooled heat exchanger 103, the heater core 116 and the engine 115 by the water pump 117, but may not circulate when the engine is not operated or in other circumstances.

Figure 4:
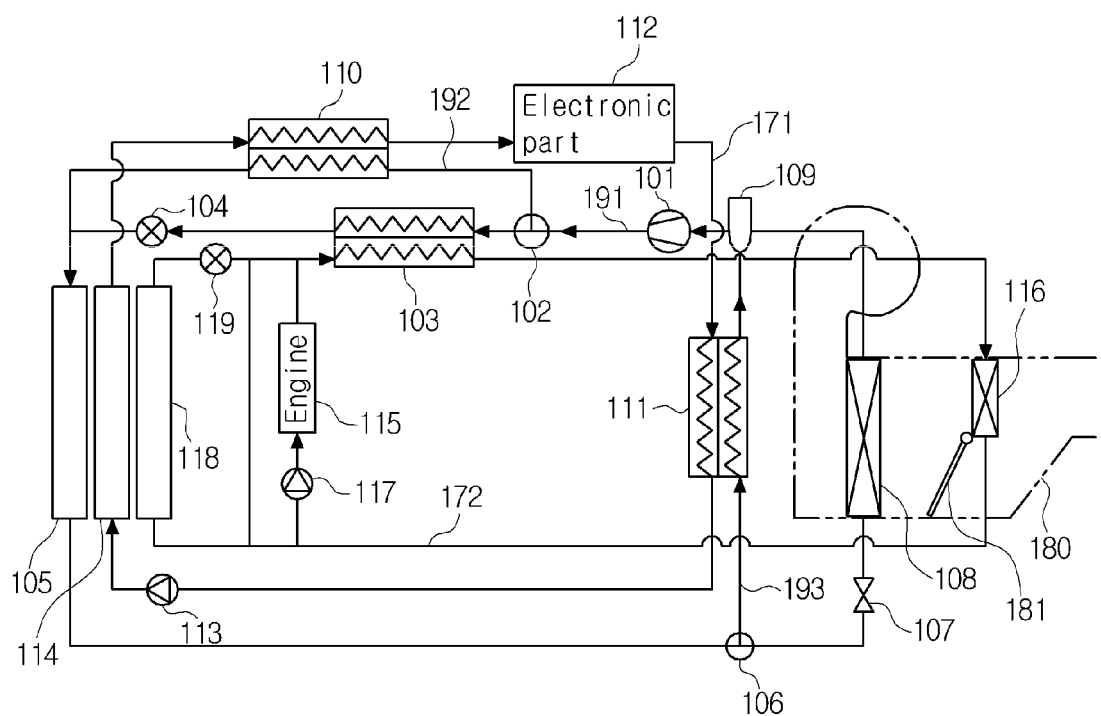
FIG. 4 is a view of a heating mode of the heat pump system for a vehicle according to the first preferred embodiment of the present invention.

FIG. 4 is a view of a heating mode of the heat pump system for a vehicle according to the first preferred embodiment of the present invention.

Referring to FIG. 4, in the heating mode, the refrigerant of high temperature and high pressure discharged from the compressor 101 passes through the water-cooled heat exchanger 103 by the first valve 102. In this instance, the refrigerant of high temperature and high pressure is condensed by heating the coolant of the first coolant line 172. The refrigerant passing through the water-cooled heat exchanger 103 is expanded in the second expansion means 104, passes through the air-cooled condenser 105, bypasses the first expansion means 107 and the evaporator 108 by the second valve 106, and then, passes through the chiller 111. The refrigerant cools the coolant of the second coolant line 171 while passing through the chiller 111, passes the accumulator 109, and then, is returned to the compressor 101.

The coolant circulating in the second coolant line 171 repeatedly circulates the electronic parts 112, the chiller 111, the low temperature radiator 114, the water-cooled condenser 110, and the electronic parts 112 by the water pump 113. Additionally, the coolant circulating in the first coolant line 172 repeatedly circulates the engine 115, the water-cooled heat exchanger 103, the heater core 116, and the engine 115 by the water pump 117.

Figure 5:
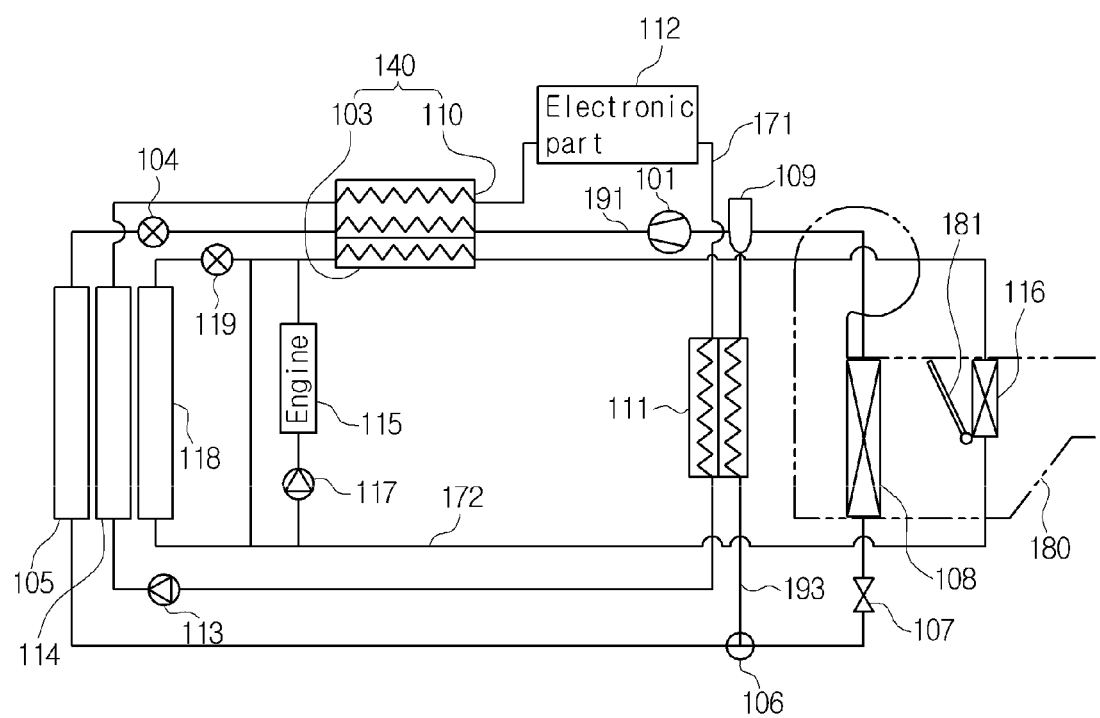
FIG. 5 is a view of a heat pump system for a vehicle according to a second preferred embodiment of the present invention.

FIG. 5 is a view of a heat pump system for a vehicle according to a second preferred embodiment of the present invention. In this embodiment, detailed description of the same configuration as the first preferred embodiment will be omitted.

Referring to FIG. 5, the heat pump system for a vehicle according to the second preferred embodiment of the present invention is applied to a plug-in hybrid vehicle, and includes an evaporator 108, a heater core 116, a first coolant line 172, a compressor 101, an air-cooled condenser 105, a first expansion means 107, and a second expansion means 104.

Moreover, the heat pump system for a vehicle according to the second preferred embodiment of the present invention further includes a second coolant line 171, a low-temperature radiator 114, a water-cooled condenser 110, a water-cooled heat exchanger 103, a second refrigerant branch line 193, a chiller 111, and a second valve 106.

The water-cooled condenser 110 is disposed in the second coolant line 171 between the low-temperature radiator 114 and the electronic parts 112, and the water-cooled heat exchanger 103 is disposed in the first coolant line 172 between the heater core 116 and the engine 116.

Especially, the water-cooled heat exchanger 103 and the water-cooled condenser 110 are integrated with each other to form a module unit 140. The refrigerant discharged from the compressor 101 passes through all of the water-cooled heat exchanger 103 and the water-cooled condenser 110 and exchanges heat between the coolant in the first coolant line 172 and the coolant in the second coolant line 171.

Furthermore, the first expansion means 107 is disposed upstream of the evaporator 108 to expand the refrigerant. Preferably, the first expansion means 107 is an expansion valve actuated mechanically or electronically.

The second expansion means 104 is disposed between the water-cooled condenser 110 and the air-cooled condenser 105, and operates as a two-way valve in the cooling mode and as an orifice in the heating mode.

Figure 6:
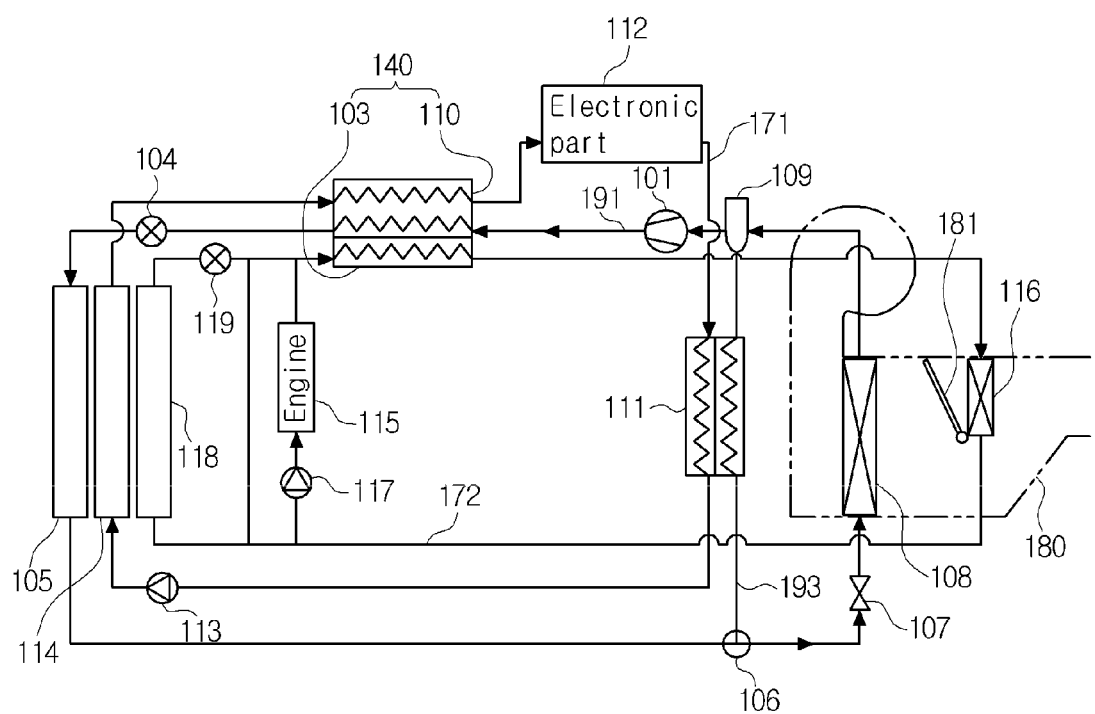
FIG. 6 is a view of a cooling mode of the heat pump system for a vehicle according to the second preferred embodiment of the present invention.

FIG. 6 is a view of a cooling mode of the heat pump system for a vehicle according to the second preferred embodiment of the present invention.

Referring to FIG. 6, in the cooling mode, the refrigerant of high temperature and high pressure discharged from the compressor 101 passes through the module unit 140, in which the water-cooled heat exchanger 103 and the water-cooled condenser 110 are integrated, passes the second expansion means 104, and passes through the air-cooled condenser 105. In this instance, the refrigerant of high temperature and high pressure is condensed by exchanging heat with the coolant of the second coolant line 171 while passing through the module unit 140, and then, is condensed again by exchanging heat with outdoor air in the air-cooled condenser 105.

The refrigerant passing through the air-cooled condenser 105 is expanded into a low-temperature and low-pressure state while passing the first expansion means by the second valve 106, and then, is evaporated by exchanging heat with the air discharged to the interior of the vehicle while passing through the evaporator 108, so that the interior of the vehicle is cooled. The temperature adjusting door 181 closes the passage of the heater core 116. The refrigerant passing through the evaporator 108 passes the accumulator 109, and then, is returned to the compressor 101. In this instance, by the second valve 106, some of the refrigerant passing through the air-cooled condenser 105 flows toward the evaporator 108 and the remainder of the refrigerant flows toward the second refrigerant branch line 193 to pass through the chiller 111.

The coolant circulating in the second coolant line 171 repeatedly circulates the electronic parts 112, the chiller 111, the low-temperature radiator 114, the water-cooled condenser 110 and the electronic parts 112 by the water pump 113. Additionally, the coolant circulating in the first coolant line 172 repeatedly circulates the engine 115, the water-cooled heat exchanger 103, the heater core 116, and the engine 115 by the water pump 117, but may not circulate when the engine is not operated or in other circumstances.

Figure 7:
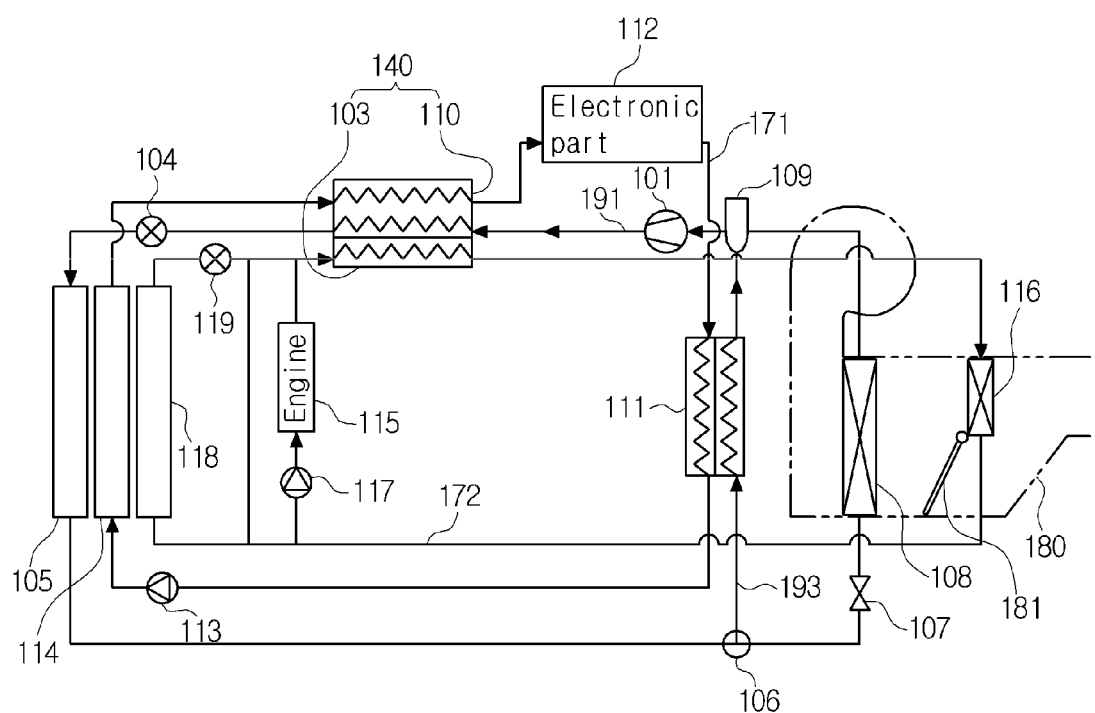
FIG. 7 is a view of a heating mode of the heat pump system for a vehicle according to the second preferred embodiment of the present invention.

FIG. 7 is a view of a heating mode of the heat pump system for a vehicle according to the second preferred embodiment of the present invention.

Referring to FIG. 7, in the heating mode, the refrigerant of high temperature and high pressure discharged from the compressor 101 passes through the module unit 140, in which the water-cooled heat exchanger 103 and the water-cooled condenser 110 are integrated, passes the second expansion means 104, is expanded while passing the orifice of the second expansion means 104, and then, passes through the air-cooled condenser 105. In this instance, the refrigerant of high temperature and high pressure heats the coolant and is condensed by exchanging heat with the coolant of the first coolant line 172 while passing through the module unit 140.

The refrigerant passing through the module unit 140 passes through the air-cooled condenser 105 after being expanded in the second expansion means 104, bypasses the first expansion means 107 and the evaporator 108 by the second valve 106, and passes through the chiller 111. The refrigerant cools the coolant of the second coolant line 171 while passing through the chiller 111, passes the accumulator 109, and then, is returned to the compressor 101.

Figure 8:
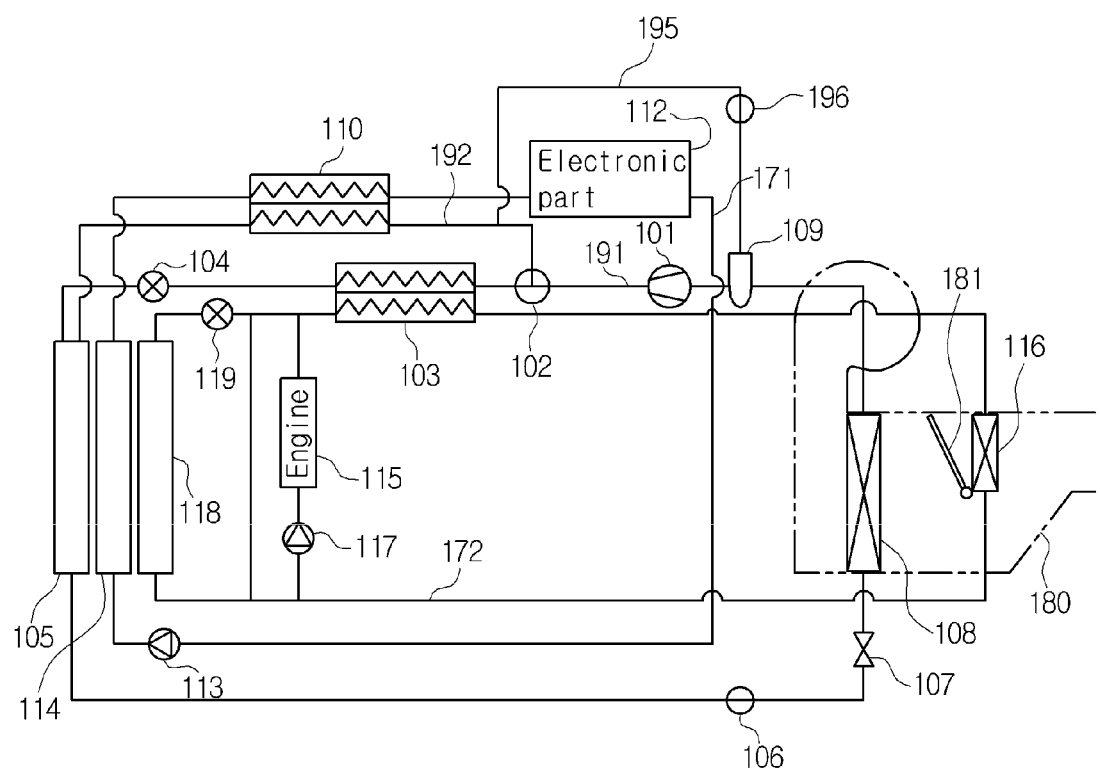
FIG. 8 is a view of a heat pump system for a vehicle according to a third preferred embodiment of the present invention.
Figure 9:
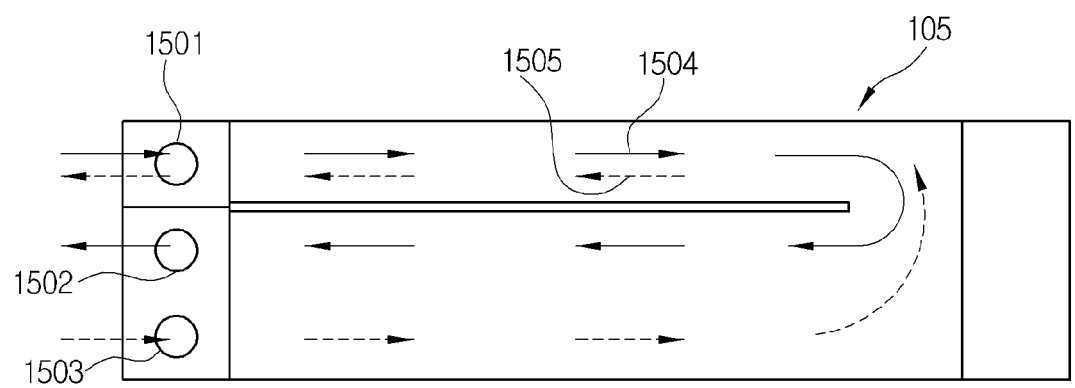
FIG. 9 illustrates an air-cooled condenser of the heat pump system for a vehicle according to the third preferred embodiment of the present invention.

FIG. 8 is a view of a heat pump system for a vehicle according to a third preferred embodiment of the present invention, and FIG. 9 illustrates an air-cooled condenser of the heat pump system for a vehicle according to the third preferred embodiment of the present invention. In this embodiment, detailed description of the same configuration as the first preferred embodiment will be omitted.

Referring to FIGS. 8 and 9, the heat pump system for a vehicle according to the third preferred embodiment of the present invention is applied to a plug-in hybrid vehicle, and includes an evaporator 108, a heater core 116, a first coolant line 172, a compressor 101, an air-cooled condenser 105, a first expansion means 107, a water-cooled heat exchanger 103, and a second expansion means 104.

Moreover, the heat pump system for a vehicle according to the third preferred embodiment of the present invention further includes a second coolant line 171, a low-temperature radiator 114, a first refrigerant branch line 192, a first valve 102, a third refrigerant branch line 195, a second valve 106, and a third valve 196.

The heat pump system for a vehicle is comprised of a first refrigerant circulation loop which is a circulation passage of refrigerant in the cooling mode and a second refrigerant circulation loop which is a circulation passage of refrigerant in the heating mode. The first refrigerant circulation loop makes the refrigerant circulate the compressor 101, the water-cooled condenser 110, the air-cooled condenser 105, the expansion means 107, and the evaporator 108 in order.

The second refrigerant circulation loop is configured in such a way that the refrigerant flowing through the compressor 101, the water-cooled heat exchanger 103, the second expansion means 104, and the air-cooled condenser 105 in order is returned to the compressor 101 after passing the water-cooled condenser 110 through an inlet of the air-cooled condenser 105 of the first refrigerant circulation loop.

The air-cooled condenser 105 is connected with a refrigerant line. The air-cooled condenser 105 includes: a first connection part 1501 which is an inlet of refrigerant in the cooling mode and an outlet of the refrigerant in the heating mode; a second connection part 1502 which is an outlet of the refrigerant in the cooling mode; and a third connection part 1503 which is an inlet of the refrigerant in the heating mode. In FIG. 9, the solid arrow 1504 shows a flow of the refrigerant in the cooling mode and the dotted arrow 1505 shows a flow of the refrigerant in the heating mode.

As described above, through the optimized inlet and outlet structure of the air-cooled condenser 105, in the heating mode, since the refrigerant is discharged to the refrigerant inlet of the cooling mode, the water-cooled condenser 110 can be utilized to recover waste heat.

The second valve 106 is disposed in a refrigerant line between the air-cooled condenser 105 and the first expansion means 107. The second valve 106 opens the refrigerant line passage in the cooling mode, and closes the passage in the heating mode. The heat pump system for a vehicle can prevent a reverse flow of the refrigerant in the heating mode due to the structure of the second valve 106.

The third refrigerant branch line 195 branches off from the first refrigerant branch line 192 between the first valve 102 and the water-cooled condenser 110, and is connected to the upstream side of the compressor 101. The third valve 196 is disposed in the third refrigerant branch line 195 to close the passage in the cooling mode and open the passage in the heating mode. The heat pump system for a vehicle can prevent a reverse flow of the refrigerant in the heating mode due to the structure of the third valve 196.

Figure 10:
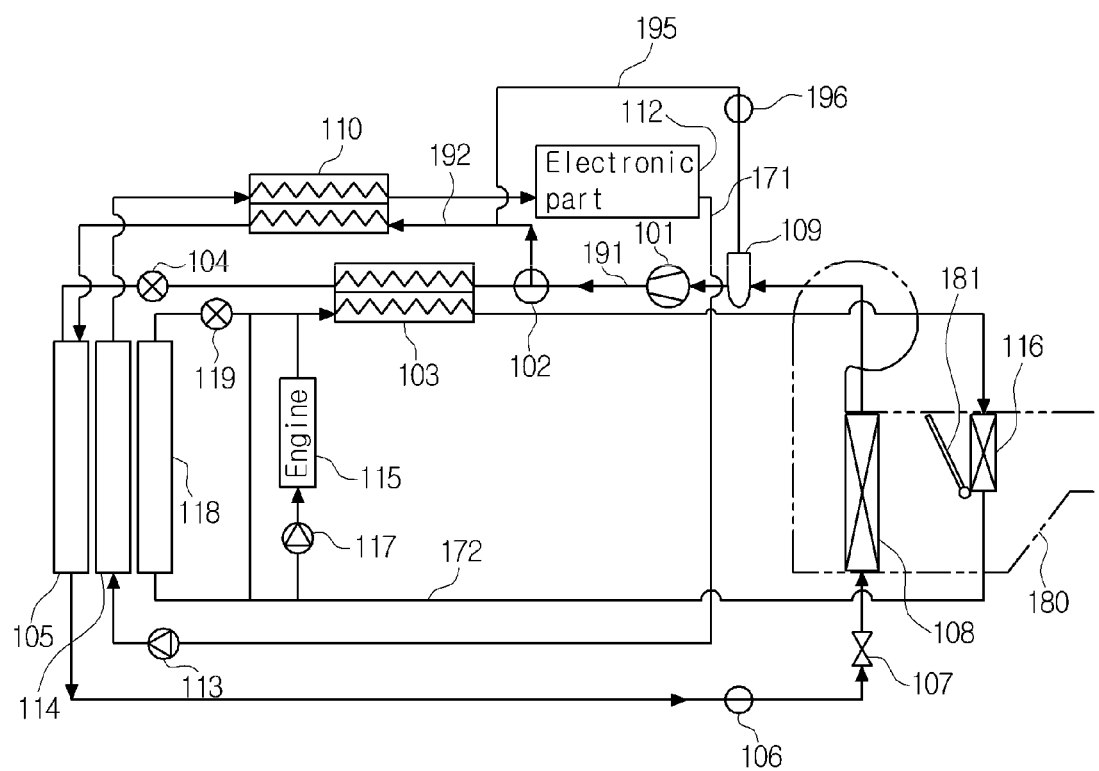
FIG. 10 is a view of a cooling mode of the heat pump system for a vehicle according to the third preferred embodiment of the present invention.

FIG. 10 is a view of a cooling mode of the heat pump system for a vehicle according to the third preferred embodiment of the present invention.

Referring to FIG. 10, in the cooling mode, the refrigerant of high temperature and high pressure discharged from the compressor 101 flows to the first refrigerant branch line 192 by the first valve 102, and passes through the air-cooled condenser 105 after passing the water-cooled condenser 110. The refrigerant passing through the air-cooled condenser 105 is expanded into a low temperature and low pressure state while passing through the first expansion means 107 after passing the second valve 106, and then, is evaporated by exchanging heat with the air discharged to the interior of the vehicle while passing through the evaporator 108, so that the interior of the vehicle is cooled.

Figure 11:
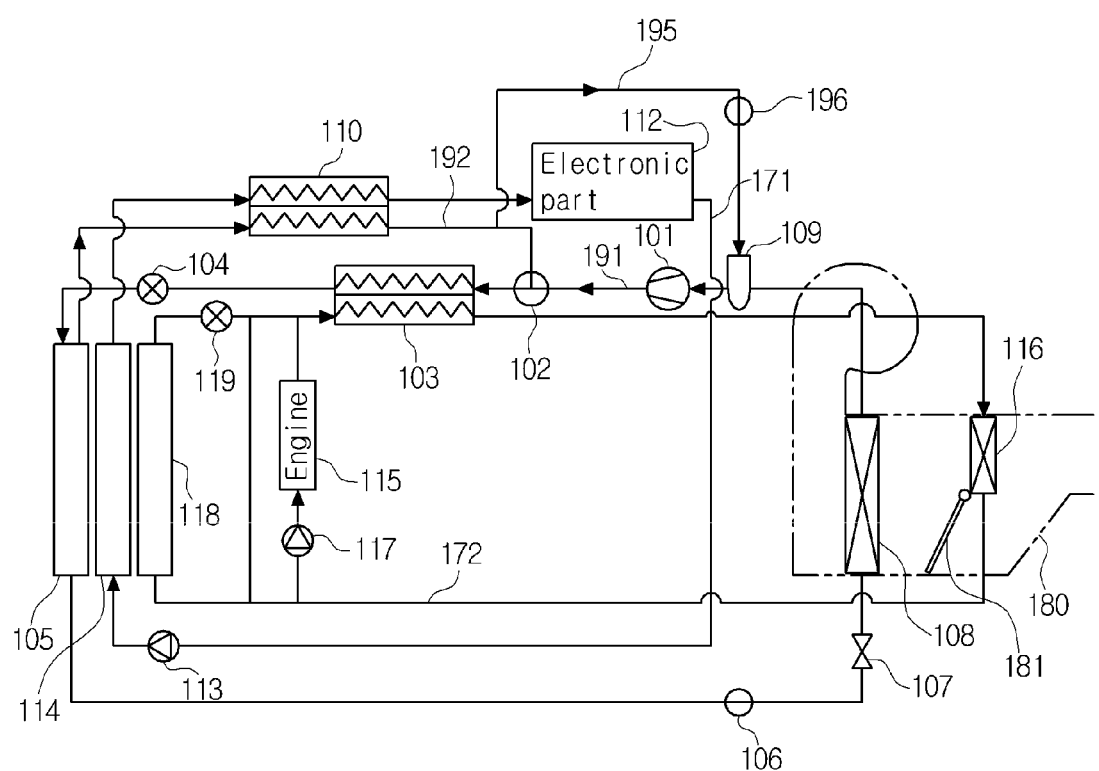
FIG. 11 is a view of a heating mode of the heat pump system for a vehicle according to the third preferred embodiment of the present invention.

FIG. 11 is a view of a heating mode of the heat pump system for a vehicle according to the third preferred embodiment of the present invention.

Referring to FIG. 11, the refrigerant of high temperature and high pressure discharged from the compressor 101 passes through the water-cooled heat exchanger 103 by the first valve 102. The refrigerant passing through the water-cooled heat exchanger 103 flows into the air-cooled condenser 105 after being expanded in the second expansion means 104, and is discharged to the first refrigerant branch line 192. After that, the refrigerant recovers waste heat of the electronic parts 112 while passing through the water-cooled condenser 110, passes the accumulator 109 after passing the third valve 196, and then, is returned to the compressor 101.

While the present invention has been particularly shown and described with reference to exemplary embodiments thereof, it will be understood by those of ordinary skill in the art that various modifications and equivalents may be made without deviating from the spirit or scope of the invention. Therefore, it would be understood that the technical and protective scope of the present invention shall be defined by the technical idea as defined by the following claims.

The invention claimed is:

1. A heat pump system for a vehicle comprising:
   a refrigerant circulation loop containing a refrigerant disposed inside an air-conditioning case and having an evaporator for exchanging heat between air and the refrigerant;
   a first coolant line disposed inside the air-conditioning case and containing a coolant, and configured to cause the coolant to circulate through a heater core, which exchanges heat between air and the coolant;
   a second coolant line containing the coolant for cooling electronic parts of the vehicle;
   a first refrigerant-coolant heat exchanger for exchanging heat between the refrigerant and the coolant of the first coolant line;
   a second refrigerant-coolant heat exchanger for exchanging heat between the refrigerant and the coolant of the second coolant line:
   a first refrigerant branch line branching off from the refrigerant line of the refrigerant discharged from the compressor and passing through the second refrigerant-coolant heat exchanger; and
   a first valve for selectively flowing the refrigerant discharged from the compressor to the first refrigerant-coolant heat exchanger and the second refrigerant-coolant heat exchanger;
   wherein the first valve is configured to transfer the refrigerant discharged from the compressor to the first refrigerant-coolant heat exchanger in a heating mode and to transfer the refrigerant discharged from the compressor to the second refrigerant-coolant heat exchanger in a cooling mode.

2. The heat pump system according to claim 1, comprising:
   a first refrigerant circulation loop along which the refrigerant circulates through the compressor, an air-cooled condenser for exchanging heat between the refrigerant and air, a first expansion means for expanding the refrigerant, the evaporator, and the compressor in order in a cooling mode; and
   a second refrigerant circulation loop along which the refrigerant circulates through the compressor, the first refrigerant-coolant heat exchanger, a second expansion means for expanding the refrigerant, the air-cooled condenser, and the compressor in order in a heating mode.

3. The heat pump system according to claim 2, wherein the first coolant line connects an engine with the heater core so that the coolant is circulated.

4. The heat pump system according to claim 3, wherein the first refrigerant-coolant heat exchanger is disposed along the first coolant line between the engine and the heater core to exchange heat between the refrigerant passing through the compressor and the coolant of the first coolant line while the refrigerant is at a high temperature and high pressure.

5. The heat pump system according to claim 2, further comprising:
   a low-temperature radiator disposed in the second coolant line to exchange heat between the coolant and air,
   wherein the second refrigerant-coolant heat exchanger is disposed in a refrigerant line between the compressor of the first refrigerant circulation loop and the air-cooled condenser.

6. The heat pump system according to claim 5, wherein the second refrigerant-coolant heat exchanger is arranged between the low-temperature radiator and the electronic parts.

7. The heat pump system according to claim 1, wherein the first refrigerant branch line is connected between the second expansion means and the air-cooled condenser.

8. The heat pump system according to claim 5, further comprising:
   a second refrigerant branch line branching off from the refrigerant line downstream of the air-cooled condenser and joining to the compressor after bypassing the evaporator;
   a chiller disposed along the second refrigerant branch line and arranged between the electronic parts and the low-temperature radiator to exchange heat between the refrigerant of the second refrigerant branch line and the coolant of the second coolant line; and
   a second valve for selectively flowing the refrigerant passing through the air-cooled condenser to the evaporator and the chiller.

9. The heat pump system according to claim 5, wherein the second refrigerant circulation loop is configured in such a way that the refrigerant flowing through the compressor, the first refrigerant-coolant heat exchanger, the second expansion means, and the air-cooled condenser in order passes the second refrigerant-coolant heat exchanger through an inlet of the air-cooled condenser of the first refrigerant circulation loop, and is returned to the compressor.

10. The heat pump system according to claim 9, wherein the air-cooled condenser is connected with the refrigerant line, and includes a first connection part which is an inlet of the refrigerant in the cooling mode and is an outlet of the refrigerant in the heating mode, a second connection part which is an outlet of the refrigerant in the cooling mode, and a third connection part which is an inlet of the refrigerant in the heating mode.

11. The heat pump system according to claim 9, wherein a second valve is disposed in the refrigerant line between the air-cooled condenser and the first expansion means in order to open a refrigerant line passage in the cooling mode and close the passage in the heating mode.

12. The heat pump system according to claim 9, comprising:
- a first refrigerant branch line branching off from the refrigerant line of the refrigerant discharged from the compressor and passing through the second refrigerant-coolant heat exchanger;
- a first valve for selectively flowing the refrigerant discharged from the compressor to the first refrigerant-coolant heat exchanger and the second refrigerant-coolant heat exchanger;
- a third refrigerant branch line branching off from the first refrigerant branch line between the first valve and the second refrigerant-coolant heat exchanger and connected to the upstream side of the compressor; and
- a third valve disposed in the third refrigerant branch line to close the passage in the cooling mode and open the passage in the heating mode.

13. The heat pump system according to claim 1, wherein the heat pump system exchanges heat between the refrigerant discharged from the compressor and the coolant before flowing to the heater core of the first coolant line in a heat pump mode, and exchanges heat between the refrigerant discharged from the compressor and the coolant before flowing to the electronic parts of the second coolant line.

14. The heat pump system according to claim 1, wherein the first refrigerant-coolant heat exchanger and the second refrigerant-coolant heat exchanger are integrated with each other as a heat exchanger.

15. The heat pump system according to claim 14, wherein the refrigerant passes through all of the first refrigerant-coolant heat exchanger and the second refrigerant-coolant heat exchanger, and the coolant line is formed to be isolated.

* * * * *